(12) United States Patent
Gann et al.

(10) Patent No.: US 9,258,458 B2
(45) Date of Patent: Feb. 9, 2016

(54) DISPLAYING AN IMAGE WITH AN AVAILABLE EFFECT APPLIED

(75) Inventors: Robert Gregory Gann, Bellvue, CO (US); Murray Dean Craig, Johnstown, CO (US); Steven Douglas Stoecker, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 865 days.

(21) Appl. No.: 12/391,458

(22) Filed: Feb. 24, 2009

(65) Prior Publication Data

US 2010/0214483 A1    Aug. 26, 2010

(51) Int. Cl.
*G09G 5/00* (2006.01)
*H04N 1/60* (2006.01)
*G06K 9/00* (2006.01)
*G06T 5/00* (2006.01)

(52) U.S. Cl.
CPC .......... *H04N 1/6011* (2013.01); *G06K 9/00624* (2013.01); *G06T 5/00* (2013.01); *H04N 1/6027* (2013.01); *G06T 2207/10004* (2013.01)

(58) Field of Classification Search
None
See application file for complete search history.

(56) References Cited

U.S. PATENT DOCUMENTS

| | | | | |
|---|---|---|---|---|
| 4,253,154 | A * | 2/1981 | Russ et al. | 250/311 |
| 5,469,536 | A * | 11/1995 | Blank | 345/594 |
| 5,973,686 | A * | 10/1999 | Shimogori | 715/746 |
| 6,130,676 | A * | 10/2000 | Wise et al. | 345/619 |
| 6,266,069 | B1 | 7/2001 | Thagard et al. | |
| 6,580,837 | B1 * | 6/2003 | Johnson | 382/300 |
| 6,778,226 | B1 | 8/2004 | Eshelman et al. | |
| 6,803,923 | B1 * | 10/2004 | Hamburg | 345/629 |
| 7,020,381 | B1 * | 3/2006 | Kato et al. | 386/280 |
| 7,194,130 | B2 * | 3/2007 | Nishikawa | 382/167 |
| 7,263,221 | B1 * | 8/2007 | Moriwaki | 382/167 |
| 7,643,065 | B2 * | 1/2010 | Mikawa | 348/211.99 |
| 2002/0054112 | A1 * | 5/2002 | Hasegawa et al. | 345/764 |
| 2002/0163531 | A1 * | 11/2002 | Ihara et al. | 345/719 |
| 2003/0179298 | A1 * | 9/2003 | Akiyama et al. | 348/222.1 |
| 2004/0170337 | A1 * | 9/2004 | Simon et al. | 382/254 |
| 2005/0212955 | A1 * | 9/2005 | Craig et al. | 348/362 |
| 2006/0101351 | A1 * | 5/2006 | Cowham | 715/783 |
| 2006/0188147 | A1 * | 8/2006 | Rai et al. | 382/162 |
| 2006/0244759 | A1 * | 11/2006 | Kempf | 345/611 |
| 2006/0267985 | A1 * | 11/2006 | Brodie et al. | 345/442 |
| 2007/0263113 | A1 * | 11/2007 | Baek et al. | 348/340 |
| 2008/0085055 | A1 * | 4/2008 | Cerosaletti et al. | 382/225 |
| 2008/0170124 | A1 * | 7/2008 | Hatanaka et al. | 348/208.4 |
| 2008/0285891 | A1 * | 11/2008 | Fuchs et al. | 382/305 |
| 2008/0310712 | A1 * | 12/2008 | Edgar | 382/167 |
| 2009/0024922 | A1 * | 1/2009 | Markowitz et al. | 715/716 |
| 2009/0085918 | A1 * | 4/2009 | Hollingworth et al. | 345/475 |
| 2009/0115799 | A1 * | 5/2009 | Chen et al. | 345/655 |
| 2009/0202173 | A1 * | 8/2009 | Weiss et al. | 382/276 |
| 2009/0309808 | A1 * | 12/2009 | Swingler | 345/1.3 |
| 2009/0319897 | A1 * | 12/2009 | Kotler et al. | 715/711 |
| 2010/0079573 | A1 * | 4/2010 | Isaac | 348/14.01 |
| 2010/0111406 | A1 * | 5/2010 | Hertzfeld et al. | 382/162 |

* cited by examiner

*Primary Examiner* — David H Chu
(74) *Attorney, Agent, or Firm* — Hewlett-Packard Patent Department

(57) ABSTRACT

A method for automatically displaying an image with an available effect applied on a digital display device includes analyzing the image stored on a storage device and choosing the available effect to apply to the image, where analyzing the image includes executing an image analysis on the image to identify at least one characteristic of the image, where the available effect to apply to the image to be displayed is automatically chosen from a list of available effects which may be applied to the image in consideration of the at least one characteristic of the image, and rendering the image with the available effect applied on the digital display device.

20 Claims, 6 Drawing Sheets

DISPLAYING AN IMAGE WITH AN AVAILABLE EFFECT APPLIED

BACKGROUND

The rendering of an image with an effect applied on a digital display device conventionally requires a user being present and for the user to manually modify and apply an effect to each image for display on the digital display device. The user often continuously transfers each image to a computer for the purpose of manually editing the image and to apply an effect to each image using a photo editing application until a desirable effect for the image is reached. Additionally, the user often exercises discretion and continue a trial and error process without much aid in determining what form of effect would be suitable for the image. Furthermore, the user may find that he often continues to repeat this approach each time the image has become undesirable.

BRIEF DESCRIPTION OF THE DRAWINGS

Various features and advantages of the invention will be apparent from the detailed description which follows, taken in conjunction with the accompanying drawings, which together illustrate, by way of example, features of the invention and wherein.

DETAILED DESCRIPTION

Embodiments of the present invention differ from previous approaches by automatically executing an image analysis on an image stored on a storage device and applying an effect to the image. A common practice for the conventional displaying of an image with effects applied to the image is manually transferring the image to a computer and utilizing a photo editing application to manually edit the original image. As a result, a user may find that extraneous funds, time, and resources are wasted in manually transferring each image, opening each image in a photo editing application, and manually editing and adding an effect to each image following a trial and error process. In addition, the user may sometimes make irreversible edits or apply effects that the user or another individual may later find undesirable. The user may be dissatisfied in finding that the image has been permanently modified and the original has further been lost. The present invention alleviates many of the burdens of the user, yet continues to apply high quality effects to the image by automatically analyzing the image, creating a list of effects for the image, and applying an effect to the image.

Figure 1:
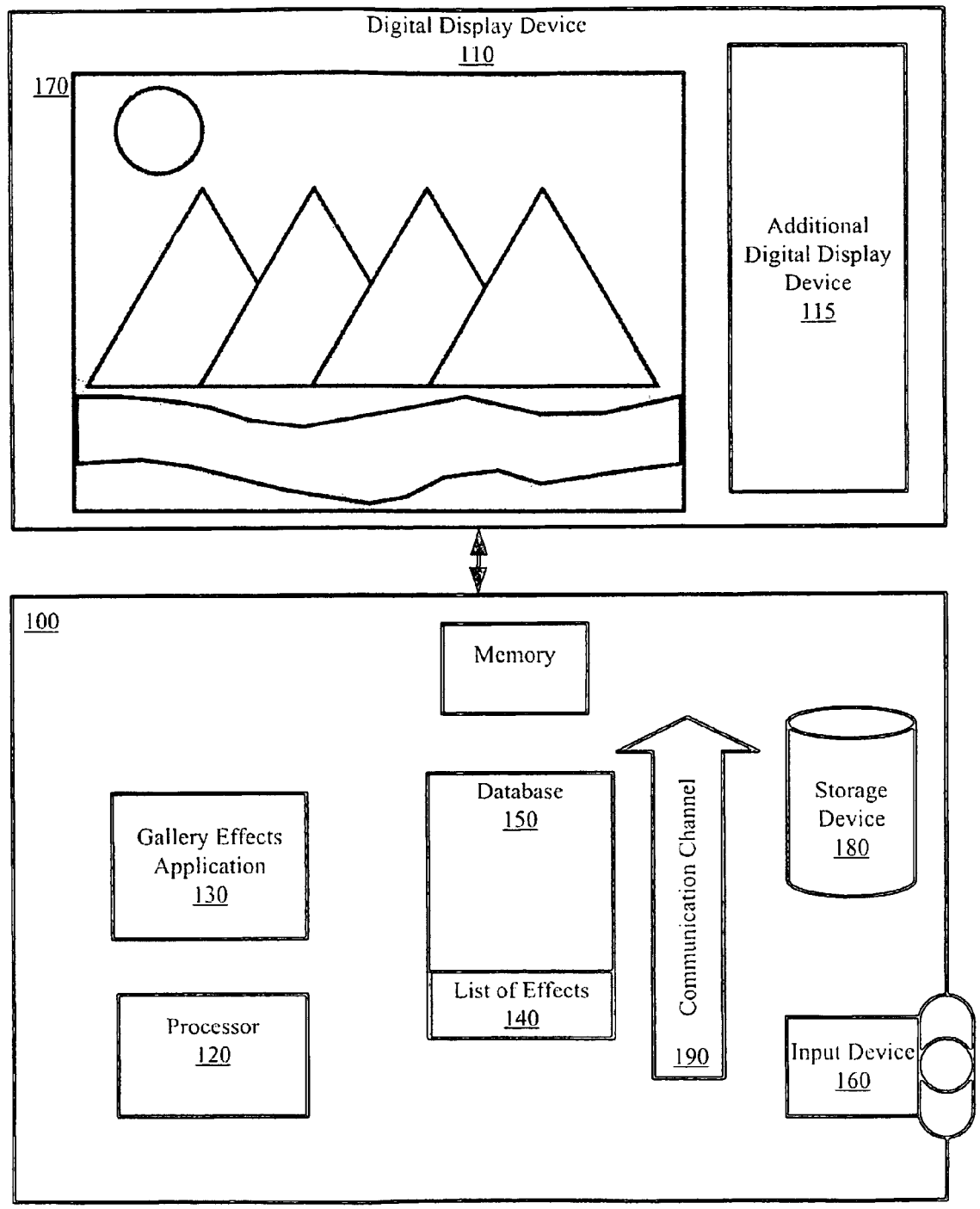
FIG. 1 illustrates a system coupled to a digital display device rendering at least one image with an effect applied on to at least one digital display device according to an embodiment of the invention.

FIG. 1 illustrates a system coupled to a digital display device rendering at least one image with an effect applied on to at least one digital display device according to an embodiment of the invention. The system may be a traditional computer, a laptop, or a portable computing device, such as a digital picture frame, a cell phone, a GPS or navigation system and/or any device that may render an image on a coupled digital display device. As illustrated in FIG. 1, the system may include a gallery effects application executable from the computer readable memory, and a list of effects stored in a database. Further as illustrated in FIG. 1, the system may include a processor, memory, a storage device, an input device, and a communication channel for the components and/or devices of the system. The system may include additional devices and components and may be attached and/or coupled to additional devices or components in addition to and/or in lieu of those depicted in FIG. 1.

As illustrated in FIG. 1, a system 100 may be coupled to a digital display device 110. Further, the system 100 may be coupled to at least one additional digital display device 115. Digital display device 110 and additional digital display device 115 may be output devices that may display visual information in various forms, such as a still image or motion picture. Additionally, digital display device 110 and additional digital display device 115 may each be configured to utilize digital information and/or signals from the system 100 to render at least one image 170 with an effect applied. In one embodiment, digital display device 110 and additional digital display device 115 may each render the same image with the same effect or different effects applied. Additionally, digital display device 110 and additional digital display device 115 may be configured by the system 100 to render an image 170 that is partially displayed on digital display device 110 and partially displayed on additional display device 115. In another embodiment, digital display device 110 may display one image 170 with an effect applied, while additional digital display device 115 may display a different image with an additional effect applied. The system 100 may further include other additional digital display devices that may be configured to display at least one image 170 independently or in conjunction with digital display device 110 and additional digital display device 115.

As noted above, the system 100 may include a gallery effects application 130 executed by a processor 120 from computer readable memory. The gallery effects application 130 may manage the operations of the system 100 by sending instructions to one or more components and/or devices included in and/or coupled to the system 100. The gallery effects application 130 may be firmware that is embedded onto the system 100. Additionally, the gallery effects application 130 may be a software application stored on the system 100 through a storage device 180 and accessible by the system 100 or the gallery effects application 130 may be stored on a computer readable medium readable and accessible by the system 100 from a different location. Further, the gallery effects application 130 may be stored and/or accessed through a server coupled through a local area network or a wide area network. The gallery effects application 130 may communicate with other additional devices and/or components coupled to the system 100 physically or wirelessly through one or more communication channels 190 included in or attached to the system 100.

The gallery effects application 130 may initially scan a storage device 180 coupled to the system 100 for one or more images 170. One or more images 170 may be a digital image, such as a photo, scene, or action shot, that may be stored on the storage device 180 and rendered for display on digital display device 110 and/or additional digital display device 115. Further, one or more images 170 on the storage device 180 may have the same resolution or each may have different resolutions and may be uncompressed or compressed using various compression algorithms. Further, one or more image 170 displayed on digital display device 110 and/or additional digital display device 115 may have an effect applied to the image 170. The storage device 180 may be an internal or external device that may store images locally or remotely for the system 100. Further, the storage device 180 may be locally or remotely coupled to the system 100 through a local area network or a wide area network. The storage device may be a hard drive or a removable form of media, such as a USB drive, a SD (Mini, Micro) card, a XD Card, a compact flash card, a memory stick pro (duo), and/or a compact disc that stores one or more images.

After scanning the storage device 180 for one or more images 170, the gallery effects application 130 may analyze the next image to be rendered on the digital display device 110 and/or the additional digital display device 115. In one embodiment, the gallery effects application 130 may individually analyze an image 170 when the image 170 is the next image 170 to be displayed. Additionally, the gallery effects application 130 may continue to analyze each additional image stored on the storage device 180 after analyzing the next image 170 to be rendered or the gallery effects application 130 may analyze each image on the storage device 180 concurrently. In analyzing one or more images 170 with an image analysis, the gallery effects application 130 may identify at least one characteristic of the image 170 with an image analysis. Further, the gallery effects application 130 may initially identify whether the image is dominantly a portrait, a scene, or an action shot. The image analysis may include one or more analysis that may be executed on the image 170. In one embodiment, in identifying at least one characteristic of the image 170, the gallery effects application 130 may scan a bit map of the image 170 and execute an edge analysis, a color analysis, and a morphology analysis on the image 170. In another embodiment, the image analysis may identify whether the image 170 is a portrait, scene, or action shot with an face detection analysis and a scene analysis before identifying at least one characteristic of the image. Additionally, the gallery effects application 130 may scan and analyze a meta data associated with the file conjunction with each executed analysis to identify at least one characteristic of the image 170.

As noted above, the gallery effects application 130 may initially identify whether the image 170 is dominantly a portrait, a landscape, or an action shot by executing a face detection analysis and a scene analysis on the image 170. In one embodiment, while executing the face detection analysis and the scene analysis on (he image 170, the gallery effects application 130 may scan a bit map of the image 170 and look for pattern on the image 170. The gallery effects application 130 may execute a face detection analysis by scanning the image 170 and identify that the pattern indicates that the image 170 includes a face in the image 170. Alternatively, the gallery effects application 130 may execute a scene analysis on the image 170 and identify that the pattern indicates that the image 170 includes a mountain or a beach. After identifying at least one portrait, scene, or action shot, the gallery effects may determine whether the identified face or scene is dominant in the image 170. In determining whether it is dominant, the gallery effects application 130 may calculate the number or ratio of pixels used for the identified face in comparison to the rest of the image 170 or in comparison to other elements identified in the image 170. If the number or ratio of pixels for the identified face exceed or has a greater ratio than other identified elements in the photo, then the gallery effects application 130 may identify the image 170 is dominantly a portrait. The gallery effects application 130 may utilize additional means and/or methods in identifying whether the image 170 is dominantly a portrait, a scene, and/or an action shot.

Further, if the image 170 is determined to dominantly be a portrait, the gallery effects application 130 may proceed to execute a facial feature analysis on the image 170, where the facial feature analysis determines an emotion of at least one individual in the image 170. In executing the facial feature analysis, the gallery effects application 130 may scan an identified face in the image and identify the expression of the face. In one embodiment, the facial feature analysis may identify that the face in the image 170 is smiling or laughing. As a result, the gallery effects application 130 may make a note when creating a list of effects 140 to choose effects that will accentuate or brighten the image 170 to reflect the smiling or laughing face. In another embodiment, the facial feature analysis, may identify that the face in the image 170 is frowning or appears to be unhappy. The gallery effects application 130 may utilize this information when creating the list of effects 140 to amplify the mood of the image 170 by choosing darker effects to apply to the image 170.

After identifying whether the image 170 is dominantly a portrait, scene, or action shot, in one embodiment, the gallery effects application 130 may proceed to automatically correct the image 170 by examining a meta data on the image and scanning the image 170 for flaws, in automatically correcting the image 170, the gallery effects application 130 may perform at least one from the group including red eye removal, pet eye fix, contrast adjustment, brightness adjustment, rotation, cropping, distorting, color adjustment, and scaling. In one embodiment, the gallery effects application 130 may access at least one meta data on the image 170 or each image and scan for information that may indicate whether the image 170 may contain flaws. A meta data of the image 170 may indicate that a flash was used when taking the image, the gallery effects application may scan at least one face in the image 170 for a red-eye. If the red-eye is found, the gallery effects application 130 may automatically correct the red-eye. The gallery effects application 130 may utilize additional means and/or methods in identifying whether the image 170 contains an error and automatically correcting the image.

Further, after automatically correcting the image 170 and identifying that the image 170 is dominantly a portrait, a scene, or an action shot, the gallery effects application 130 may proceed to execute at least one analysis on the image 170 to identify at least one characteristics of the image 170. At least one characteristic may include, but is not limited to, a brightness of the image 170, a flash usage in the image 170, a number of individuals in the image 170, and a contrast of the image 170. Further, at least one analysis may include, but is not limited to an edge analysis, a color analysis, and a color morphology analysis. In one embodiment, the gallery effects application 130 may proceed to execute an edge analysis on the image 170, a color analysis, and a color morphology analysis on the image 170 or any additional image. The color analysis may be utilized by the gallery effects application 130 to determine a complementing color that may be applied to the image as an independent effect or part of an effect. A color may be understood to be any color on the color table, including white, black, and grey. In executing the color analysis, the gallery effects application 130 may scan at least one adjacent color on a color table for an appropriate color that may be used as a portion of the effect. In one embodiment, the appropriate color may be a complimenting color. Additionally, in executing the color morphology, the gallery effects application 130 may scan the image 170 and identify where on the image 170 or additional image 170 to apply the effect. In one embodiment, the gallery effects application 130 may utilize the fact that the image 170 has been identified to dominantly be a portrait and determine that an effect may be applied to the edges of the image 170 in order to focus on the individual in the middle of the image 170. Further, the gallery effects application 130 may utilize information from the facial feature analysis, indicating that the face is smiling, and choose a bright color such as yellow to compliment the effect applied to the edges of the image 170. The gallery effects application 130 may identify at least one characteristic or any additional characteristic using other additional analysis in addition to and/or in lieu of those noted above.

After identifying at least one characteristic of the image 170, the gallery effects application 130 may proceed to create or update a list of effects 140 which may store at least one available effect based on whether the image 170 is a portrait, a landscape, or an action shot. As noted above, an effect may modify and/or alter the visual appearance of the image 170, such as a color, brightness, and/or contrast of the image 170, when displayed on digital display device 110 and/or additional digital display device 115. Additionally, the effect may modify a color of the image or an effect used on the image 170. Alternatively, the effect, such as a user defined effect or a default effect, in some instances may not modify or produce any visual difference from the original image. An effect applied to the image may include, but is not limited to, at least one from the group consisting of a kaleidoscope effect, a retro filter effect, a solarization effect, a blur effect, a zoom effect, a color effect, a sepia effect, an antiquing effect, an ambient surrounding color effect, a fade effect, a center focus effect, a vignette effect, a slimming effect, and a merging with additional image effect. The list of effects 140 may include one or more of the previously noted effects or it may include other additional effects in addition to and/or in lieu of those noted above. Each effect may be applied through applying a mask on top of the original image and rending the image 170 with the mask applied on the digital display device 110 and/or the additional digital display device 115 or each effect may be applied through creating a new image with the effect applied and rendering the new image with the effect applied on the digital display device 110 and/or the additional digital display device 115.

The list of effects 140 may be created or updated based upon whether the image 170 is a portrait, scene, or action shot, and on at least one characteristic of the image 170 determined from each executed analysis. Additionally, the list of effects 140 may include effects that may compliment the image 170 based on each executed analysis. Further, the list of effects 140 may be created or accessed by the gallery effects application 130 from a local or remote storage device 180 and may be created or stored on a file or on a database 150 accessible to the system 100. In one embodiment, each image 170 may have a corresponding list of effects 140 for the image 170. Each corresponding list of effects 140 may then be stored on a corresponding file referenced to the corresponding image 170 or the corresponding list of effects 140 may be stored as an entry on the database 150 accessible to the system 100. In another embodiment, the system may include or may access a master list of effects. The master list of effects may include every effect that may be applied to a specific image or any image. The gallery effects application 130 may then choose one or more effects from the master list to create a corresponding list of effects for the corresponding image 170 based on whether the image 170 is a portrait, a landscape, or an action shot, and at least one characteristic of the image 170. Further, each list of effects 140 may include one or more category. One or more categories in each list of effects 140 may be a bold category, a subtle category, a user defined category, a default category, and/or a random category. The category may represent the form, style, or genre of effect. In one embodiment, all effects in the list may be included in the default category. Additionally, the user category may include effects that a user has created. The user may create an effect that adds smudges to parts of the image 170 or the user may create an effect that does not modify the image 170 at all, so that the image 170 may be viewed in its original form. Further, the bold category may include effects that are more vibrant, eye-catching, and/or energetic. In addition, the subtle category may include effects that are more calm, tranquil, or serene. The random category may include one or more, but not all, effects from each category.

In one embodiment, after the list of effects 140 has been created or updated, the gallery effects application 130 may proceed to scan for a request to choose the available effect to be applied to the image 170. The gallery effects application 130 may also scan for a request to define a category of effects to be applied to the image 170 to be displayed. The request may be initiated by a user accessing an input device 160 or by another device/application accessing the system 100. The input device 160 may be a device that can receive and process physical, optical, wireless, or voice inputs or commands. In one embodiment, a user may access the input device 160 and the gallery effects application may present the list of effects for display and access for the user. The user may then navigate through the list of effects or the list of categories: through the input device 160 and choose an effect or a category of effects to apply to the image 170 or each image. Additionally, the request to choose the available effect for the image may be programmed through the gallery effects application 130 or an additional application that may have access to the gallery effects application 130.

If an effect or a category of effects is not chosen by a user or another device/application, the gallery effects application 130 may automatically choose an available effect to apply to the image 170 or each additional image from the list of effects 140. After choosing an effect from the list of effects 140, the gallery effects application 130 may render the image 170 with the available effect applied on at least one digital display device and/or at least one additional digital display device. After rending at least one image 170 with an effect applied, the gallery effects application 130 may update the list of the available effects after applying the effect from the list of available 140 effects by removing the available effect applied from the list of available effects 130. After each effect from the list of effects 140 has been applied to the image 170, the list of effects 140 may continue to be updated by removing an effect from the list of effects 140 after each use. When the list of effects 140 has become empty, the gallery effects application may replenish the list of effects 140 and each effect on the list will be available to apply again. Further, the gallery effects application 130 may also scan for request to not utilize the available effect applied to the image 170. As noted above, the request may be initiated by a user through the input device 160 or through another device/application accessing the system 100 or gallery effects application 130. If the request is detected by a user or another application, the gallery effects application 130 may remove the effect from the list of available effects 140. The gallery effects application 130 may send an instruction and make a note not to utilize the marked effect on the image again.

Figure 2:
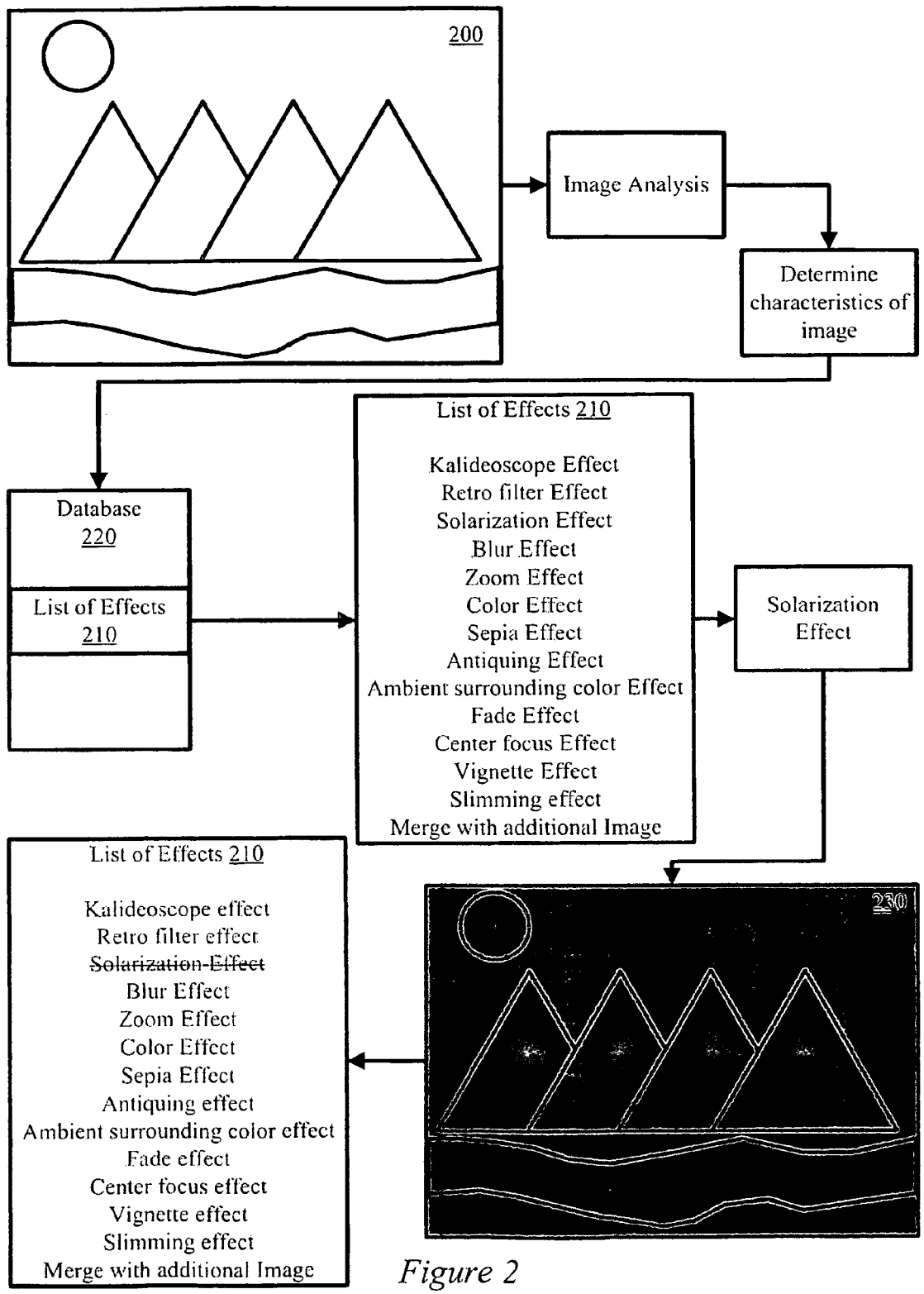
FIG. 2 illustrates an image being analyzed to determine at least one characteristic of the image, creating or updating a list of effects on a database in consideration of at least one characteristic of the image, and choosing an effect to apply to the image from the list of effects according to an embodiment of the invention.

FIG. 2 illustrates an image being analyzed to determine at least one characteristic of the image, creating or updating a list of effects on a database in consideration of at least one characteristic of the image, and choosing an effect to apply to the image from the list of effects according to an embodiment of the invention. As noted above, an image 200 may initially be accessed from a storage device. Further, the image 200 may then be analyzed using an image analysis to determine at least one characteristic of the image. After at least one characteristic has been identified using the image analysis, the gallery effects application may create a list of effects 210. As illustrated in FIG. 2, the list of effects 210 may be created or updated and stored on a database 220. Further, as illustrated in FIG. 2, the database 220 may have a corresponding entry for the list of effects 210 for the image 200. The list of effects 210 may include a Kaleidoscope Effect, a Retro filter Effect, a Solarization Effect, a Blur Effect, a Zoom Effect, a Color Effect, a Sepia Effect, an Antiquing Effect, an Ambient surrounding color Effect, a Fade Effect, a Center focus Effect, a Vignette Effect, a Slimming effect, and a Merge with additional Image.

As noted above, the gallery effects application may choose an effect from the list of effects 210 to apply to the image 200. In the present embodiment, the gallery effects application may choose to apply the solarization effect from the list of effects 210 onto the image 200. As illustrated in FIG. 2, the gallery effects application may apply the solarization effect to the image 200 and then render the image 230 with the solarization effect applied on at least one digital display device. Further, as illustrated in FIG. 2, after the solarization effect has been selected from the list of effects 210 and applied to the image 200, the gallery effects application may update the list of effects 210 to reflect that the solarization effect has been used.

Figure 3:
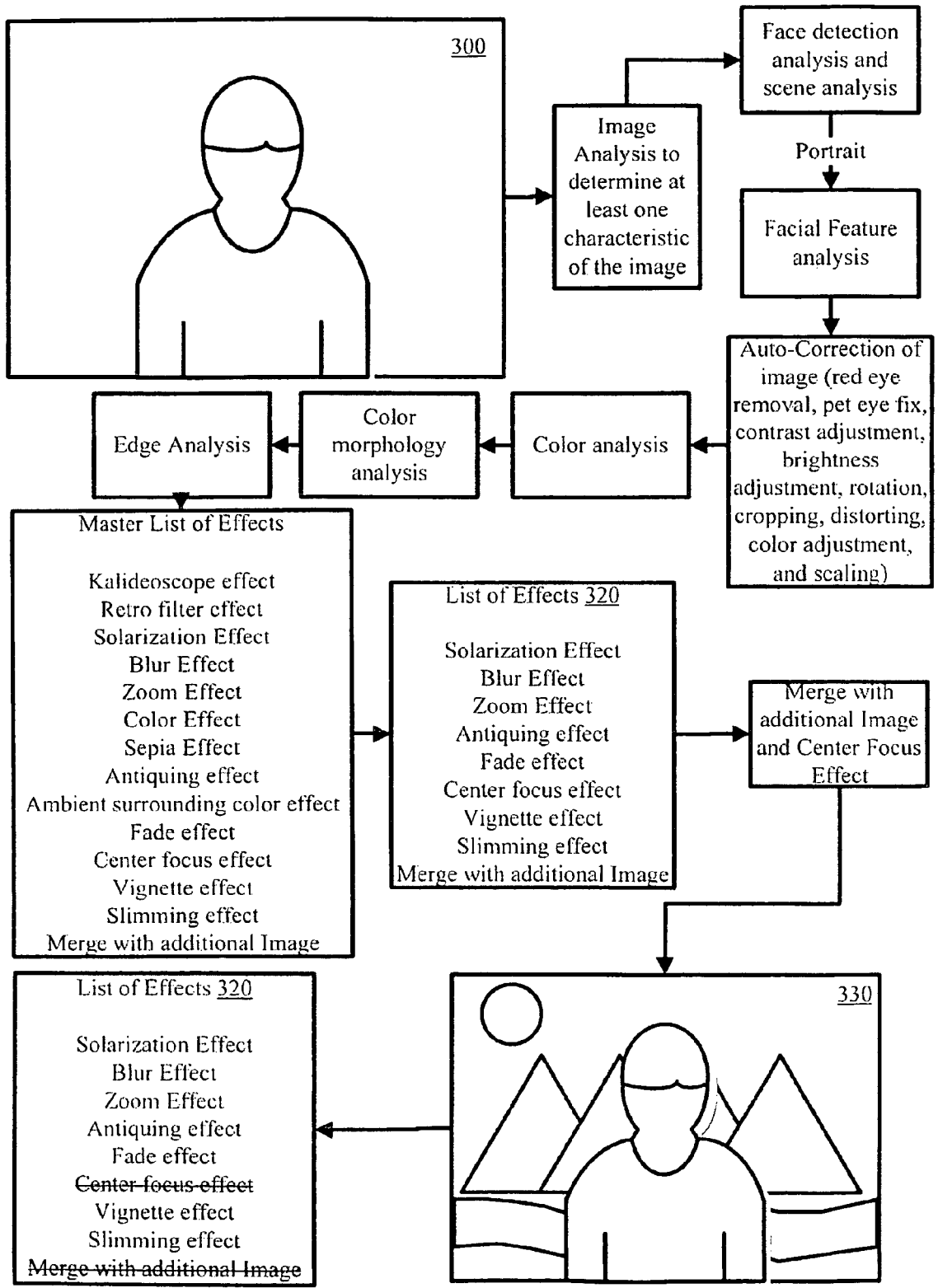
FIG. 3 illustrates at least one analysis being executed on an image to identify whether the image is dominantly a portrait, a scene, or action shot, identify at least one characteristic of the image, creating or updating a list of effects based on each analysis and at least one characteristic of the image, and applying at least one effect to the image according to an embodiment of the invention.

FIG. 3 illustrates at least one analysis being executed on an image to identify whether the image is dominantly a portrait, a scene, or action shot, identify at least one characteristic of the image, creating or updating a list of effects based on each analysis and at least one characteristic of the image, and applying at least one effect to the image according to an embodiment of the invention. Similar to above, an image 300 may initially be accessed from a storage device. An image analysis may then be executed on the image 300 to determine at least one characteristic of the image 300. As illustrated in FIG. 3, in one embodiment, the image analysis may include executing a face detection analysis and a scene analysis. The gallery effects application may scan a bitmap of the image and recognize that a face is present. Further, the gallery effects application may then determine whether the image is dominantly a portrait, scene or action shot. In the present embodiment, the gallery effects application may find that the ratio of pixels used for the face is greater than any other identified portrait, scene, or action shot in the image 300. As a result, the image may be determined to be dominantly a portrait. As illustrated in FIG. 3, the gallery effects application may further execute a facial feature analysis on the image since the image is determined to be dominantly a portrait.

Further, as illustrated in FIG. 3, the gallery effects application may auto-correct the image. In the present embodiment, the gallery effects application may have examined the meta data of the file and identified that a flash was used. The gallery effects application may then scan for and automatically correct the red-eye in the image 300. After autocorrecting the image 300, the gallery effects application may continue to execute at least one analysis on the image 300 to identify at least one characteristic of the image 300. As illustrated in FIG. 3, the gallery effects application may execute a color analysis, a color morphology analysis, and an edge analysis on the image 300. As noted above, the gallery effects application may access a master list of effects. The gallery effects application may then create a new list of effects 310, choosing one or more effects from the master list of effects based on the results of each previously executed analysis. As a result, the gallery effects application may determine that a Solarization Effect, a Blur Effect, a Zoom Effect, an Antiquing effect, a Fade effect, a Center focus effect, a Vignette effect, a Slimming effect, and/or a Merge with additional Image effect are each effects that may be applied to image 300 individually or in conjunction with another effect. As illustrated in FIG. 3, the gallery effects application may choose to apply more than one effect. The gallery effects application may merge the image 300 with an additional image and also apply a center focus effect from the merged images 300. The image 330 may then have two effects applied and the image 330 may be rendered for display on at least one digital display device. After applying the effects, the gallery effects application may remove the two previously applied effects from the list of effects 320.

Figure 4:
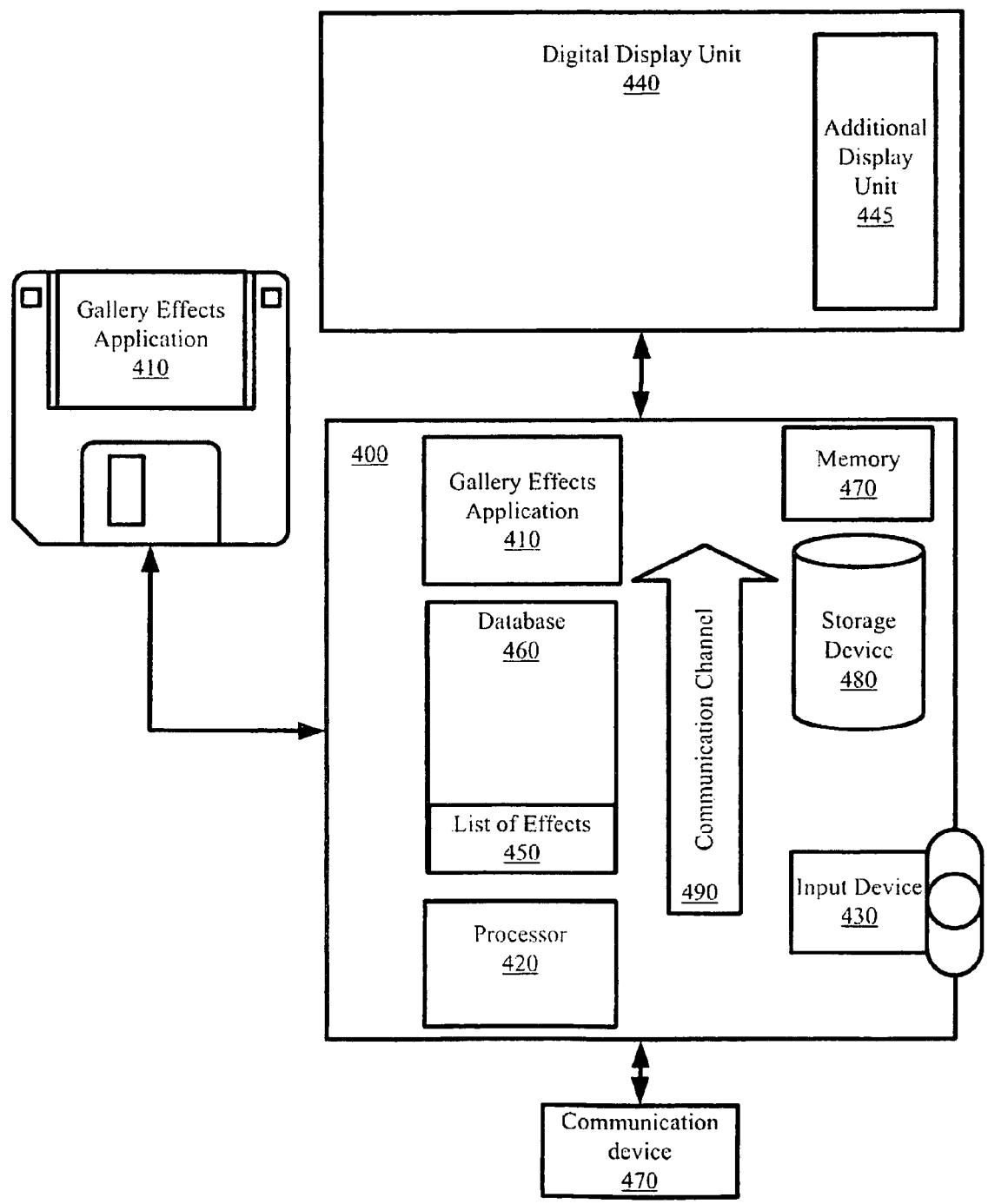
FIG. 4 illustrates a gallery effects application that may be embedded into a system and/or may be stored on a removable medium being accessed by the system according to one or more embodiments of the invention.

FIG. 4 illustrates a gallery effects application that may be embedded into a system and/or may be stored on a removable medium being accessed by the system according to one or more embodiments of the invention. As noted above, the gallery effects application 410 may control and/or manager the hardware components of a system, a digital display device, and an additional digital display device, by sending instructions and/or commands to each component of the system, the digital display device, and the additional digital display device independently or in conjunction using one or more communication channels.

Further, as noted above, the gallery effects application 410 may be firmware that may be imbedded into one or more components of the system 400. Additionally, the gallery effects application 410 may be a software application which may be stored and accessed from a hard drive, a compact disc, a flash disk, a network drive or any other form of computer readable medium that is connected to the system 400. In one embodiment, the gallery effects application 410 may be stored on a server or another device that may be coupled to the system 400. The system 400 may utilize a local area network or a wide area network to store and access the gallery effects application 410. The gallery effects application 410 may be stored and accessed from additional devices in addition to and/or in lieu of those depicted in FIG. 4.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention as illustrated herein, which would occur to one of ordinary skill within the relevant art and having possession of this disclosure, are to be considered within the scope of the invention.

Figure 5:
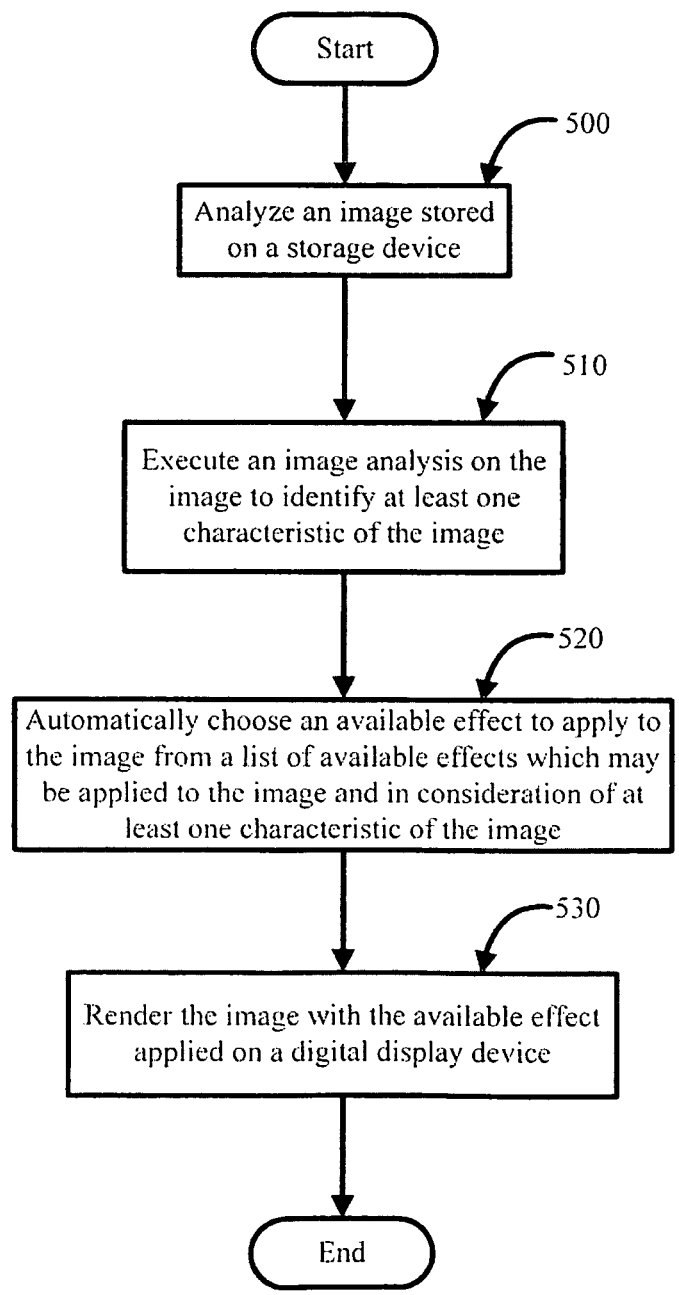
FIG. 5 is a flow chart illustrating a method for automatically displaying an image with an available effect applied on a digital display device according to an embodiment of the invention.

FIG. 5 is a flow chart illustrating a method for automatically displaying an image with an available effect applied on a digital display device according to an embodiment of the invention. The method of FIG. 5 utilizes a gallery effects application, an image analysis, a list of available effects, a storage device, and a digital display device. The method of FIG. 5 may utilize additional components are/or devices in addition to and/or in lieu of those depicted in FIG. 1, FIG. 5 and noted above.

As noted above, a gallery effects application may be software-based and may either be launched locally or remotely. The gallery effects application may initially analyze an image stored on a storage device 500. The gallery effects application may then execute an image analysis on the image to identify at least one characteristic of the image 510. The gallery effects application may then automatically choose an available effect to apply to the image from a list of available effects which may be applied to the image and in consideration of at least one characteristic of the image 520. As noted above, the list of effects may be created based on at least one characteristic of the image. Further, the results of the image analysis, which may include additional analysis, may be used to determine at least one characteristic of the image. After the gallery effects application has chosen an available effect to apply to the image, the gallery effects application may then render the image with the available effect applied on a digital display device 530.

The method for automatically displaying an image with an available effect applied on a digital display device may then be complete or the method may repeat and continue to analyze an image stored on a storage device 500. The system or the gallery effects application may utilize additional methods for automatically displaying an image with an available effect applied on a digital display device in addition to and/or in lieu of those depicted in FIG. 5.

Figure 6:
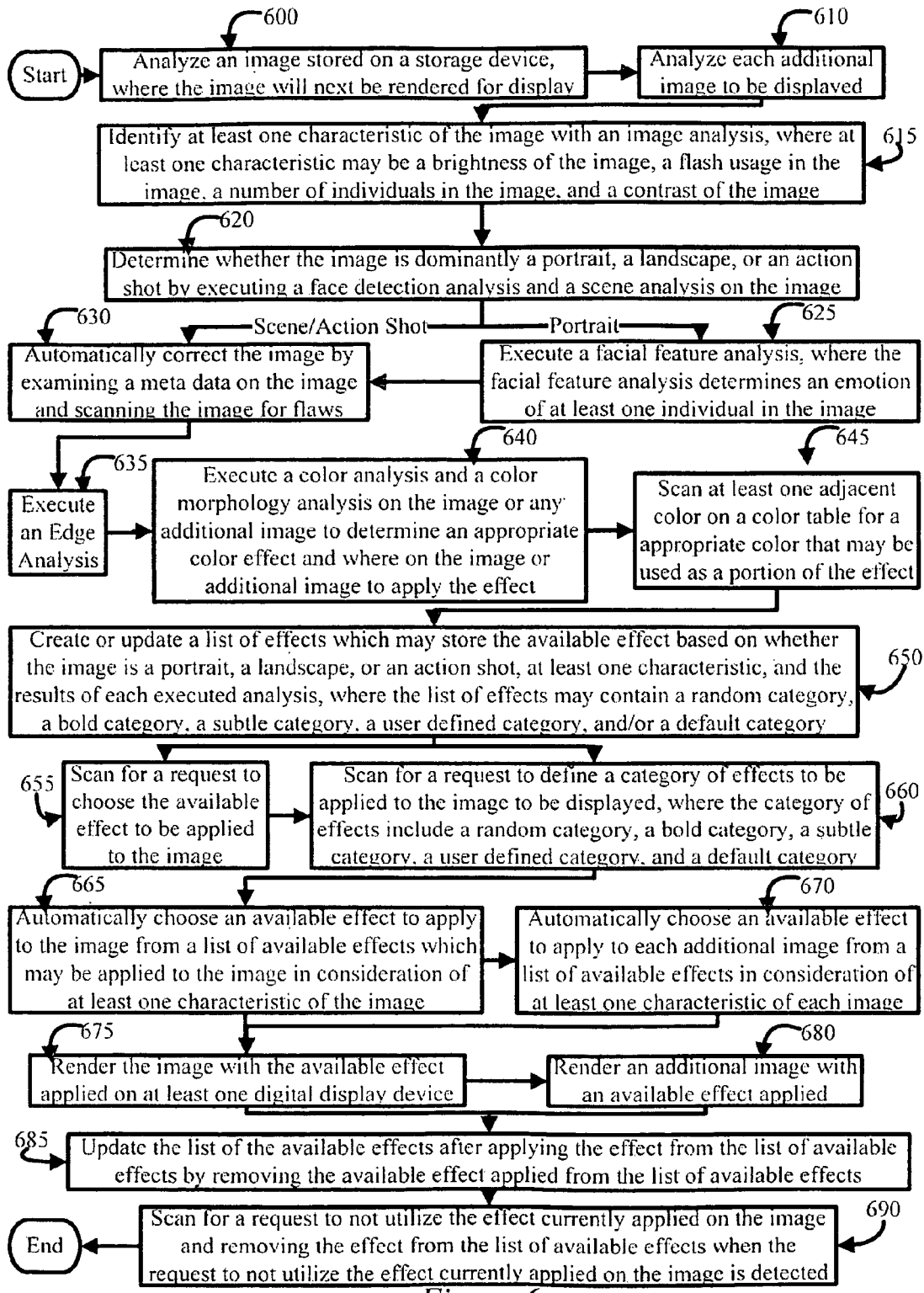
FIG. 6 is a flow chart illustrating a method for analyzing at least one image stored on a storage device and automatically displaying an image with an available effect applied on a digital display device according to an embodiment of the invention.

FIG. 6 is a flow chart illustrating a method for analyzing at least one image stored on a storage device and automatically displaying an image with an available effect applied on a digital display device according to an embodiment of the invention. The method of FIG. 6 utilizes a gallery effects application, a database, a list of available effects, an image analysis, an input device, a storage device, a digital display device, and an additional digital display device. The method of FIG. 6 may utilize additional components are/or devices in addition to and/or in lieu of those depicted in FIG. 1, FIG. 6 and noted above.

A gallery effects application may initially analyze an image stored on a storage device, where the image will next be rendered for display 600. In one embodiment, the gallery effects may also proceed to analyze each additional image to be displayed from the storage device 610. As noted above, the gallery effects application may analyze each image one by one or concurrently. The gallery effects application may next identify at least one characteristic of the image with an image analysis, where at least one characteristic may be a brightness of the image, a flash usage in the image, a number of individuals in the image, and a contrast of the image 615. As noted above, executing the image analysis may include determining whether the image is dominantly a portrait, a landscape, or an action shot by executing a face detection analysis and a scene analysis on the image 620.

If the image is determined to be a portrait, the gallery effects application may proceed to execute a facial feature analysis on the image, where the facial feature analysis determines an emotion of at least one individual in the image 625.

After executing the facial feature analysis on the image, the gallery effects application may proceed to automatically correct the image by examining a meta data on the image and scanning the image for flaws 630. Alternatively, if the image is determined to be a scene or action shot, the gallery effects application may skip executing the facial feature analysis and immediately proceed to automatically correct the image by examining a meta data on the image and scanning the image for flaws 630.

After automatically correcting the image, the gallery effects application may then proceed to execute a series of analysis on the image to identify at least one characteristic of the image. As illustrated in FIG. 6, the gallery effects application may proceed to execute an edge analysis on the image 635. After executing the edge analysis, the gallery effects application may then execute a color analysis and a color morphology analysis on the image or any additional image to determine an appropriate color effect and where on the image or additional image to apply the effect 640. As noted above, in one embodiment, the appropriate color effect may be a complimenting color. In executing the color analysis, the gallery effects application may scan at least one adjacent color on a color table for an appropriate color that may be used as a portion of the effect 645.

The gallery effects application may then create or update a list of effects which may store the available effect based on whether the image is a portrait, a landscape, or an action shot, at least one characteristic, and the results of each executed analysis, where the list of effects may contain a random category, a bold category, a subtle category, a user defined category, and/or a default category 650. As noted above, the list of effects may contain one or more effects that the gallery effects application has determined to be applicable to the image. Further, as noted above, the list of effects may be stored individually as a corresponding file for each corresponding image or the list of effects may be stored as an entry in a database.

In one embodiment, after the list of effects has been created or updated, the gallery effects application may proceed to scan for a request to choose the available effect to be applied to the image 655. As noted above, a user may access the input device and navigate through the list of effects to manually choose an effect to apply to the image. Additionally, the request to choose the available effect for the image may be programmed through the gallery effects application or an additional application that may have access to the gallery effects application. The gallery effects application may also scan for a request to define a category of effects to be applied to the image to be displayed, where the category of effects include a random category, a bold category, a subtle category, a user defined category, and a default category 660. Similar to above, the category of effects may be chosen by a user manually choosing the category or the category may be chosen automatically through additional instructions added to the gallery effects application or through an additional application that may have access to the gallery effects application.

Alternatively, the gallery effects application may skip scanning for a request to choose the available effect to be applied to the image 655 and immediately proceed to scan for a request to define a category of effects to be applied to the image to be displayed, where the category of effects include a random category, a bold category, a subtle category, a user defined category, and a default category 660. The gallery effects application may then automatically choose an available effect to apply to the image from a list of available effects which may be applied to the image in consideration of at least one characteristic of the image 665. In one embodiment, the gallery effects application may also automatically choose an available effect to apply to each additional image from a list of available effects in consideration of at least one characteristic of each image 670.

Alternatively, the gallery effects application may skip step 670 and immediately proceed to render the image with the available effect applied on at least one digital display device 675. As noted above, the image may additionally be rendered on an additional display or in conjunction with the additional display. The gallery effects application may also render an additional image with an available effect applied on the digital display device 680. After rending at least one image with an effect applied, the gallery effects application may update the list of the available effects after applying the effect from the list of available effects by removing the available effect applied from the list of available effects 685. The gallery effects may also scan for request to not utilize the effect currently applied to the image and remove the effect from the list of available effects when the request to not utilize the effect currently utilized on the image is detected 690. As noted above, the input device may be utilized to determine whether the request has been made and the request may be made by a user or an application.

The method for analyzing at least one image stored on a storage device and automatically displaying an image with an available effect applied on a digital display device may then be complete or the gallery effects application may continue to analyze at least one image stored on the storage device and repeat the method disclosed above. The system or gallery effects application may utilize additional methods for analyzing at least one image stored on a storage device and automatically displaying an image with an available effect applied on a digital display device in addition to and/or in lieu of those depicted in FIG. 6.

What is claimed is:

1. A method for automatically displaying an image with an available effect applied on a digital display device comprising:
   analyzing the image stored on a storage device and choosing the available effect to apply to the image;
   wherein analyzing the image includes executing an image analysis on the image to identify at least one characteristic of the image;
   wherein the available effect to apply to the image to be displayed is automatically chosen from a list of available effects which may be applied to the image in consideration of the at least one characteristic of the image;
   applying a mask of the available effect on top of the image and rendering the mask of the available effect over the image on the digital display device; and
   updating the list of available effects by removing the available effect applied from the list of available effects.

2. The method for automatically displaying an image with an available effect applied on a digital display device of claim 1 wherein the at least one characteristic of the image may include at least one from the group consisting of a brightness of the image, a flash usage in the image, a number of individuals in the image, and a contrast of the image.

3. The method for automatically displaying an image with an available effect applied on a digital display device of claim 1 wherein analyzing the image further includes determining whether the image is dominantly at least one from the group consisting of a portrait, a landscape, or an action shot.

4. The method for automatically displaying an image with an available effect applied on a digital display device of claim 1 further comprising scanning for a request to choose the available effect to be applied to the image.

5. The method for automatically displaying an image with an available effect applied on a digital display device of claim 1 further comprising scanning for a request to define a category of effects to be applied to the image, wherein the category of effects includes at least one from the group consisting of a random category, a bold category, a subtle category, a user defined category, and a default category.

6. The method for automatically displaying an image with an available effect applied on a digital display device of claim 1 further comprising scanning for a request to not utilize the effect currently applied on the image and removing the effect from the list of available effects when the request to not utilize the effect currently applied on the image is detected.

7. The method for automatically displaying an image with an available effect applied on a digital display device of claim 1 further comprising:
   analyzing each additional image to be displayed and choosing the available effect to apply to each additional image to be displayed;
   wherein each additional image may be stored on the storage device; and
   wherein the available effect may be stored on at least one additional list of available effects for each corresponding additional image.

8. A system comprising:
   a processor connected to computer readable memory on the system;
   a digital display device configured by the processor to display at least one image with at least one effect applied to the at least one image;
   a gallery effects application stored on the computer readable memory and configured to:
   identify at least one characteristic of the at least one image by executing at least one analysis on the at least one image;
   create or update a list of effects which may store the at least one effect that may be applied to the at least one image based on a result of each executed analysis;
   apply a mask of the at least one available effect on top of the image and render the mask of the at least one available effect over at least one effect on the digital display device; and
   update the list of available effects by removing the at least one available effect applied from the list of available effects.

9. The system of claim 8 wherein executing at least one analysis on the at least one image includes executing a color analysis and a color morphology analysis on the at least one image to determine a color effect and where on the at least one image to apply the at least one effect.

10. The system of claim 8 wherein executing at least one analysis on the at least one image further includes:
    determining whether the at least one image is at least one from the group consisting of: a portrait, a landscape, and based on a result of a face detection analysis and a scene analysis; and
    executing a facial feature analysis on the at least one image when the at least one image is determined to be the portrait, wherein the facial feature analysis determines an emotion of at least one individual in the at least one image; and wherein said gallery effects application is further configured to select an effect from said list of effects to apply to that image based, at least in part, on the emotion of said at least one individual.

11. The system of claim 8 further comprising at least one additional digital display device configured by the processor to display the same at least one image with at least one different effect applied to the same at least one image.

12. The system of claim 8 further comprising an input device to receive a request to define a category of effects to be applied to the at least one image to be displayed.

13. The system of claim 8 wherein the gallery effects application is further configured to automatically correct the at least one image by:
    examining a meta data on the image to be displayed;
    scanning the image to be displayed for flaws, said scanning being based on potential flaws indicated by said meta data; and,
    based on results of said scanning, performing at least one from the group consisting of: a red eye removal, a pet eye fix, a contrast adjustment, a brightness adjustment, a rotation, a cropping, a distorting, a color adjustment, and a scaling.

14. The system of claim 8 wherein the at least one effect may include merging the at least one image with an additional image or at least one additional effect.

15. The system of claim 8 wherein the list of effects for the at least one image may be stored and updated on a database accessible by the system.

16. The system of claim 8 wherein the gallery effects application is further configured to determine whether an image is dominantly a portrait, a landscape or an action shot and to then determine an effect from the list of effects to apply to that image based on whether that image is dominantly a portrait, a landscape or an action shot.

17. A non-transitory computer-readable program in a computer-readable medium comprising:
    a gallery effects application;
    wherein the gallery effects application is to read a storage device and scan the storage device for an image to be displayed;
    wherein the gallery effects application is further to analyze the image by executing on the image at least one from the group consisting of a face detection analysis, a scene analysis, an edge analysis, a color analysis, and a color morphology analysis;
    further wherein the gallery effects application is to create and update a list of effects that may be applied to at least one position on the image based on at least one result from each analysis executed;
    further wherein the gallery effects application is to apply a mask of the effect on top of the image and render the mask of the effect over the image on a digital display unit; and
    wherein the gallery effects application is to update the list of available effects by removing the available effect applied from the list of available effects.

18. The non-transitory computer-readable program in a computer-readable medium of claim 17 wherein executing the color analysis may include scanning at least one adjacent color on a color table for a color that may be used as a portion of the effect.

19. The non-transitory computer-readable program in a computer-readable medium of claim 18 wherein the list of effects may further be created or updated based on whether the image is at least one from the group consisting of a portrait, a landscape, or an action shot.

20. The non-transitory computer-readable program in a computer-readable medium of claim 17 wherein the effect may be at least one from the group consisting of a kalideoscope effect, a retro filter effect, a solarization effect, a blur effect, a zoom effect, a color effect, a sepia effect, an antiquing effect, an ambient surrounding color effect, a fade effect, a center focus effect, a vignette effect, a slimming effect, and a merging with additional image effect.

* * * * *

UNITED STATES PATENT AND TRADEMARK OFFICE
CERTIFICATE OF CORRECTION

PATENT NO. : 9,258,458 B2  
APPLICATION NO. : 12/391458  
DATED : February 9, 2016  
INVENTOR(S) : Robert Gregory Gann et al.

Page 1 of 1

It is certified that error appears in the above-identified patent and that said Letters Patent is hereby corrected as shown below:

Claims  
In column 14, lines 29-30, in Claim 20, delete "kalideoscope" and insert -- kaleidoscope --, therefor.

Signed and Sealed this  
Twelfth Day of July, 2016

Michelle K. Lee  
*Director of the United States Patent and Trademark Office*